(12) United States Patent
Asano et al.

(10) Patent No.: US 7,072,140 B2
(45) Date of Patent: Jul. 4, 2006

(54) DISK DRIVE HAVING AIRFLOW ADJUSTING MECHANISM AND THIN-PLATE MEMBER INCORPORATED THEREIN

(75) Inventors: Tomoyuki Asano, Tokyo (JP); Ikuko Kawamoto, Tokyo (JP)

(73) Assignee: 3M Innovative Properties Company, St. Paul, MN (US)

( * ) Notice: Subject to any disclaimer, the term of this patent is extended or adjusted under 35 U.S.C. 154(b) by 101 days.

(21) Appl. No.: 10/484,274

(22) PCT Filed: Jul. 8, 2002

(86) PCT No.: PCT/US02/21488

§ 371 (c)(1), (2), (4) Date: Jan. 20, 2004

(87) PCT Pub. No.: WO03/021596

PCT Pub. Date: Mar. 13, 2003

(65) Prior Publication Data

US 2004/0184178 A1 Sep. 23, 2004

(30) Foreign Application Priority Data

Aug. 31, 2001 (JP) ............................. 2001-264430

(51) Int. Cl.
*G11B 33/14* (2006.01)
(52) U.S. Cl. ................... 360/97.02; 360/97.03
(58) Field of Classification Search ............ 360/97.02, 360/97.01; 720/648, 650, 651
See application file for complete search history.

(56) References Cited

U.S. PATENT DOCUMENTS

| 4,339,777 A | 7/1982 | Gruczelak |
| 4,821,130 A | 4/1989 | Bernett et al. |
| 4,879,618 A | 11/1989 | Iida et al. |
| 4,885,652 A | 12/1989 | Leonard et al. |
| 4,986,496 A | 1/1991 | Marentic et al. |

(Continued)

FOREIGN PATENT DOCUMENTS

JP  54-154310  12/1979

(Continued)

*Primary Examiner*—William Korzuch
*Assistant Examiner*—Christopher R. Magee

(57) ABSTRACT

A disk drive 10 includes a thin-plate member 38 fixedly attached at a desired location to an inner wall surface 36 defining a recess 24 of a casing 12. The thin-plate member 38 includes a substrate layer having a major side on which a plurality of minute protrusions are formed and an adhesive layer attached fixedly on the back side of the substrate layer. The thin-plate member 38 is fixedly attached on the inner wall surface 36 of the casing 12 through the adhesive layer with the minute protrusions being exposed to the recess 24 of the casing 12. The thin-plate member 38 has a flexibility permitting it to follow the shape of the inner wall surface 36 of the casing 12. The thin-plate member 38 reduces an interfacial friction caused between the inner wall surface 36 of the casing and the airflow generated around the storage disk 16 in rotation.

11 Claims, 5 Drawing Sheets

U.S. PATENT DOCUMENTS

| | | | |
|---|---|---|---|
| 5,069,403 A | 12/1991 | Marentic et al. | |
| 5,133,516 A | 7/1992 | Marentic et al. | |
| 5,446,612 A | 8/1995 | Thornton et al. | |
| 5,696,649 A * | 12/1997 | Boutaghou | 360/97.03 |
| 5,848,769 A | 12/1998 | Fronek et al. | |
| 5,854,725 A | 12/1998 | Lee | |
| 6,008,965 A | 12/1999 | Izumi et al. | |
| 6,449,119 B1 | 9/2002 | Hashizume et al. | |
| 6,462,901 B1 * | 10/2002 | Tadepalli | 360/97.03 |
| 6,487,038 B1 | 11/2002 | Izumi et al. | |
| 2003/0156351 A1 * | 8/2003 | Voights et al. | 360/97.02 |

FOREIGN PATENT DOCUMENTS

| | | | |
|---|---|---|---|
| JP | 59-94273 | | 5/1984 |
| JP | 63-119078 | | 5/1988 |
| JP | 02226578 A | * | 9/1990 |
| JP | 5-100061 | | 4/1993 |
| JP | 5-101557 | | 4/1993 |
| JP | 11-073756 | | 3/1999 |
| JP | 11-297037 | | 10/1999 |
| JP | 2000-228079 | | 8/2000 |
| JP | 2000-357385 | | 12/2000 |

* cited by examiner

DISK DRIVE HAVING AIRFLOW ADJUSTING MECHANISM AND THIN-PLATE MEMBER INCORPORATED THEREIN

This application is a 371 of PCT/US 02/21488 Jul. 8, 2002

TECHNICAL FIELD OF THE INVENTION

The present invention relates to a disk drive for writing and reading data to and from a storage disk, and particularly to a disk drive having an airflow adjusting mechanism for adjusting the airflow generated around the storage disk when rotating at high speed. The present invention further relates to a thin-plate member incorporated, as an airflow adjusting mechanism, in such a disk drive.

BACKGROUND OF THE INVENTION

In a disk drive used as an auxiliary storage unit of an information processing system, any one of various disk-shaped storage media (referred to as the storage disk in this specification) such as a magnetic disk, an optical disk and a magneto-optic disk is rotated at high speed, while a head section is caused to perform the tracking operation following a multiplicity of recording tracks formed concentrically on the recording surface of the recording disk thereby to read and write data. The tracking performance of the head section depends on the positioning accuracy in the servo control operation of an actuator supporting the head section. Especially in recent years, with the remarkable increase in the recording density of the storage disk, demand has become increasingly high for a positioning accuracy of the actuator.

For the actuator to perform the highly accurate tracking operation, the external disturbances affecting the operation of the actuator are required to be minimized while at the same time eliminating the vibration of the storage disk as far as possible during rotation. For example, the airflow generated around the storage disk in high-speed rotation becomes turbulent by bombarding the inner wall surface of the casing of the disk drive and may cause the vibration of the actuator and the storage disk. The vibration of the actuator and the storage disk is a factor adversely affecting the head positioning accuracy and the dimensional accuracy of the gap between the head and the recording surface of the disk.

To cope with the vibration due to the airflow, various disk drives have been proposed which include an airflow adjusting mechanism for adjusting the airflow generated around the storage disk rotating at high speed. Japanese Unexamined Patent Publication (Kokai) No. 2000-348465, for example, discloses a hard disk drive having a rectification plate mounted on the inner wall surface of the casing. The rectification plate is a rigid member having the shape of a truncated cylinder partially surrounding the outer peripheral surface of the storage disk, and fixedly fitted in the cylindrical inner wall surface of the casing. The rectification plate is made of a tubular metal material, and has an inner peripheral surface in opposed relation to the storage disk, machined to form a rectification groove extending along the periphery thereof. The rectification plate smoothly guides along the rectification groove the airflow generated around the storage disk rotating at high speed thereby to reduce the effect that the vibration, etc. caused by the airflow has on the storage disk.

Also, Japanese Unexamined Patent Publication (Kokai) No. 2000-357385 discloses a CD-ROM device comprising a plurality of annular grooves formed concentrically of the rotational axis of the disk at locations in opposed relation to the recording surface of the storage disk. These annular grooves guide, in a circular route, the airflow caused by the rotation of the storage disk thereby to alleviate the effect that the vibration or the like caused by the airflow has on the storage disk.

Japanese Unexamined Patent Publication (Kokai) No. 11-297037 discloses a hard disk drive comprising a guide groove for forcibly moving the airflow caused by the rotation of a plurality of storage disks, diametrically outward of the rotation center in the space between the storage disks. This forcible movement of the airflow contributes to the suppression of the vibration of the storage disks.

Japanese Unexamined Patent Publication (Kokai) No. 11-73756 discloses a hard disk drive comprising a plurality of rectification walls for rectifying the airflow caused by the rotation of the storage disk, which rectification walls are formed at the corners inside the casing. The rectification walls form a cylindrical enclosure wall in collaboration with each surface opposed to the storage disk and guide the airflow smoothly.

The specification of U.S. Pat. No. 4,885,652 and Japanese Unexamined Utility Model Publication (Kokai) No. 2-16474 corresponding thereto as well as the specification of U.S. Pat. No. 4,339,777 disclose a disk drive comprising an airflow guide structure for forcibly moving the airflow caused by the rotation of the storage disk, toward an air filter arranged in the casing.

In the prior art, the casing of the disk drive includes a rigid structure made of an ordinary metal material through a casting process and has a bottomed recess for stably accommodating the main essential parts of the disk drive. The conventional various airflow adjusting mechanisms described above, therefore, require some machining step for mounting an independent member such as a rectification plate or a rectification wall on the inner wall surface defining the recess of the casing. This machining process may complicate the production process or increase the production cost of the disk drive.

The object of the present invention is to provide a disk drive for writing and reading data into and from a storage disk, comprising an inexpensive and an easy-to-mount airflow adjusting mechanism for adjusting the airflow generated around the storage disk rotating at high speed thereby to effectively suppress the effect that the vibration or the like caused by the airflow has on the storage disk.

Another object of the invention is to provide a thin-plate member capable of being incorporated, as an airflow adjusting mechanism, in a disk drive.

SUMMARY OF THE INVENTION

Figure 1:
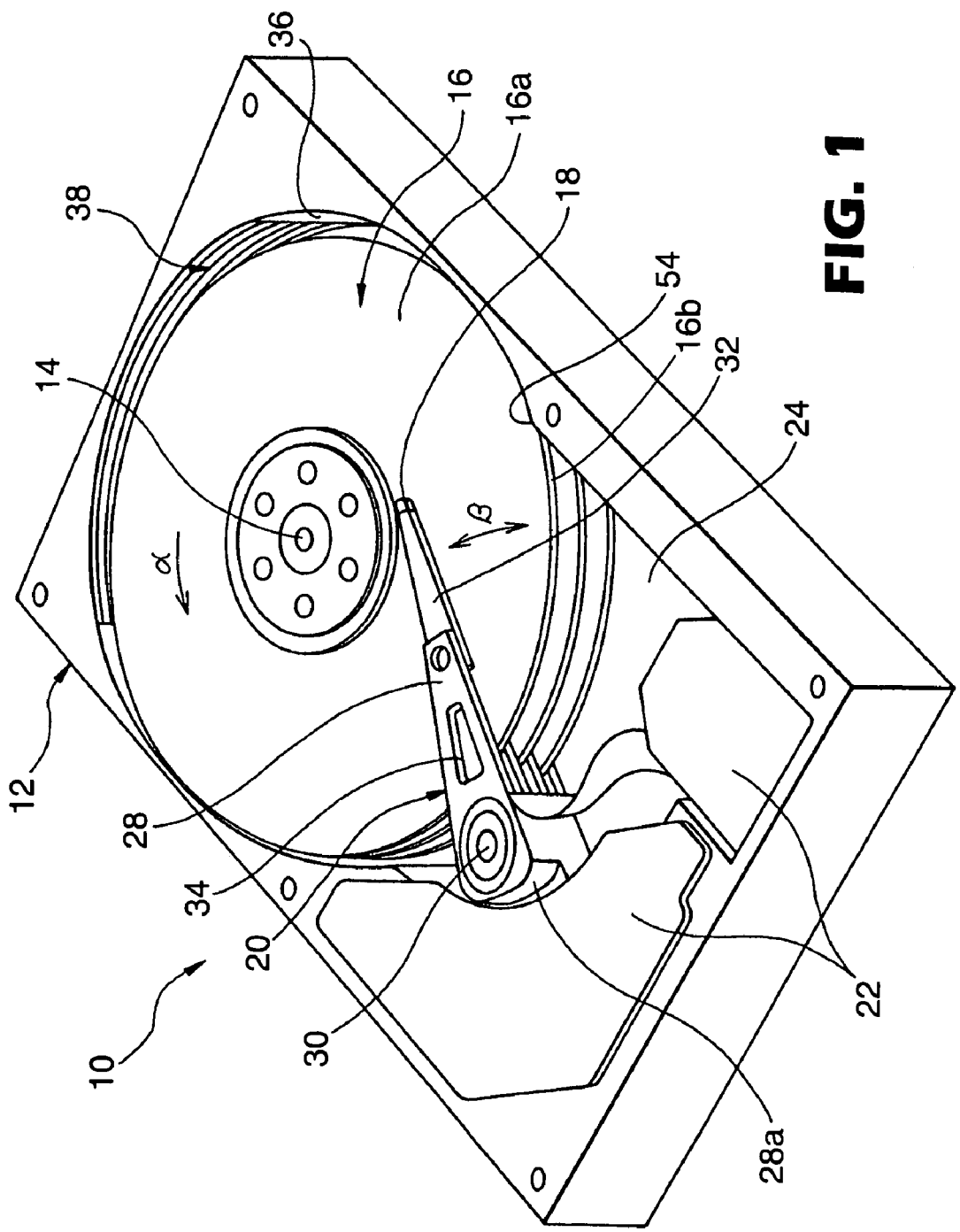
FIG. 1 is a perspective view showing a disk drive according to an embodiment of the invention with the casing cover removed.

In order to achieve the object described above, the invention as set forth in claim 1 provides a disk drive comprising a casing having an inner wall surface defining a recess; a rotatable storage disk arranged in the recess of the casing and having a recording surface; an actuator arranged in the recess of the casing at a location near the storage disk, the actuator carrying a head section to be opposed to the recording surface of the storage disk and causing the head section to perform a tracking operation relative to the recording surface; and an airflow adjusting mechanism for adjusting an airflow generated around the storage disk in the recess of the casing due to a rotation of the storage disk; wherein the airflow adjusting mechanism includes a thin-plate member having a flexibility permitting the thin-plate member to follow a shape of the inner wall surface of the casing, the thin-plate member including a substrate layer having a major side on which a plurality of minute protrusions are formed and an adhesive layer attached to a back side of the substrate layer opposite to the major side, the thin-plate member being fixedly attached to the inner wall surface of the casing through the adhesive layer with the plurality of minute protrusions being exposed to the recess of the casing.

The invention of claim 2 provides a disk drive as set forth in claim 1, wherein the plurality of minute protrusions of the thin-plate member comprise a plurality of ridges extending generally in parallel to each other.

The invention of claim 3 provides a disk drive as set forth in claim 1, wherein the plurality of minute protrusions of the thin-plate member comprise a plurality of headed elements respectively having bulging heads at distal ends thereof The invention of claim 4 provides a disk drive as set forth in claim 1 wherein the thin-plate member is arranged at a location opposed to an outer peripheral edge of the storage disk.

The invention of claim 5 provides a disk drive as set forth in claim 1 wherein the thin-plate member is arranged at a location opposed to the recording surface of the storage disk.

The invention of claim 6 provides a thin-plate member incorporated, as an airflow adjusting mechanism, in a disk drive as set forth in claim 1.

The invention of claim 7 provides a thin-plate member as set forth in claim 6, wherein the minute protrusions are arranged into specific geometric patterns with flat or open areas adjacent or alternating with other minute protrusions or intrusions formed on the major surface.

The invention of claim 8 provides a thin-plate member as set forth in claim 6, further provided with a surface having an air filtration function.

The invention of claim 9 provides a thin-plate member as set forth in claim 6, further having a function for reducing acoustic emissions from the disk drive.

The invention of claim 10 provides a thin-plate member as set forth in claim 6, further having at least one function selected from an anti-static function, a charge-surface function for attracting particulates and an absorb-moisture function.

The invention of claim 11 provides a thin-plate member as set forth in claim 6, further having at least one function selected from an electromagnetic-interference reducing function and a radio-frequency-interference reducing function.

DETAILED DESCRIPTION OF THE PREFERRED EMBODIMENT

An embodiment of the present invention will be explained in detail below with reference to the accompanying drawings. In the drawings, the same or analogous component elements are designated by the same reference numerals, respectively.

Figure 2:
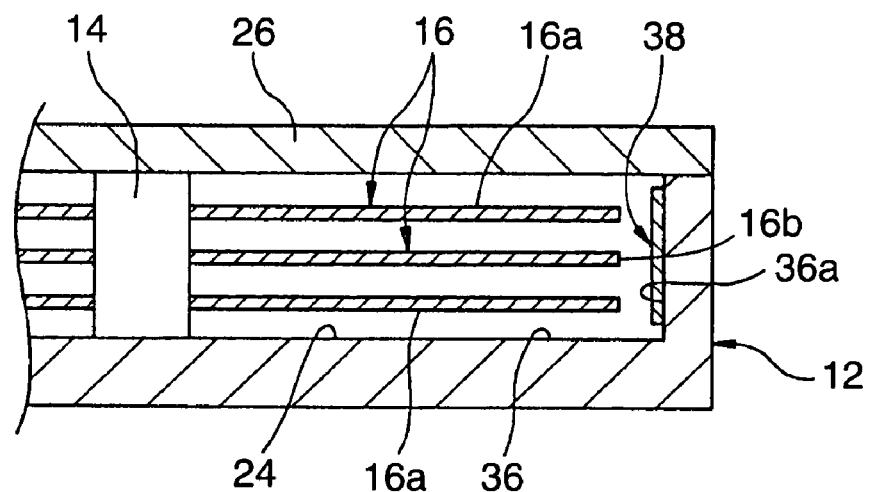
FIG. 2 is a sectional view schematically showing a plurality of storage disks and a thin-plate member of the disk drive of FIG. 1.

Referring to the drawings, FIG. 1 is a perspective view showing a disk drive 10 according to an embodiment of the invention with the casing cover thereof removed, and FIG. 2 is a sectional view schematically showing an airflow adjusting mechanism of the disk drive 10. The disk drive 10 has a configuration of a hard disk drive used as an auxiliary storage unit of an information processing system such as a personal computer.

The disk drive 10 comprises a casing 12, a plurality of (three in the drawing) storage disks 16 arranged rotatably about a common drive shaft 14 in the casing 12 and each having a recording surface 16a, a drive source (not shown) for rotationally drive the storage disks 16, an actuator movably arranged in the casing 12 in the vicinity of the storage disks 16 for supporting a plurality of head sections 18 in opposed relation to the recording surface 16a of the storage disks 16 and activating the head sections 18 to perform the tracking operation following (tracking) the recording surface 16a, and a servo mechanism 22 for driving the actuator 20.

The casing 12 has a rigid structure fabricated of a metal material, for example, through the casting process and has a bottomed recess 24 for stably accommodating the above-mentioned main essential elements of the disk drive 10. A cover 26 for shielding the recess 24 is mounted on the casing 12 with the main essential elements accommodated in the recess 24.

The storage disks 16 are magnetic disks having a recording surface 16a on the two surfaces thereof, and each recording surface 16a is formed with a multiplicity of recording tracks (not shown) concentrically about the rotation axis. The plurality of the storage disks 16 are mounted fixedly on a common drive shaft 14 at predetermined intervals with each other in the direction along the axis in the recess 24 of the casing 12, and rotated at high speed (in the direction indicated by arrow α) in synchronism with each other by the driving action of the drive source.

The actuator 20 includes a plurality of (four in the drawing) suspension arms 28 each extending along the recording surface 16a of the storage disk 16 and rotatable about a supporting shaft. The suspension arms 28 are coupled integrally to each other at the base ends thereof and the integrally coupled portions 28a are mounted on a common shaft 30. The end of each suspension arm 28 is coupled with a head supporting plate 32, like a spring plate, and a slider (not shown) making up the head section 18 carried at an end of each head supporting plate 32. The plurality of the suspension arms 28 are rotated about the shaft 30 (in the direction indicated by arrow β) in synchronism with each other over a predetermined angular range by the driving action of a servo mechanism 22 in the recess 24 of the casing 12. As a result, the head section 18 at the forward end of the head supporting plate 32 coupled to each suspension arm 28 performs the tracking operation on the recording tracks formed on the recording surface 16a of the corresponding storage disk 16 thereby to write or read the data into or from the recording surface 16a. The actuator 20 is formed with a through hole 34 at about the central portion of each suspension arm 28 to reduce the moment of inertia of the plurality of the suspension arms 28 in operation thereby to reduce the weight of the arms 28.

The disk drive 10 further comprises an airflow adjusting mechanism having the following structural features capable of effectively suppressing the effect that the airflow and the resulting vibration would otherwise might have on the storage disks 16, by adjusting the airflow caused around the plurality of the storage disks 16 rotating at high speed in the recess 24 of the casing 12.

Figure 3:
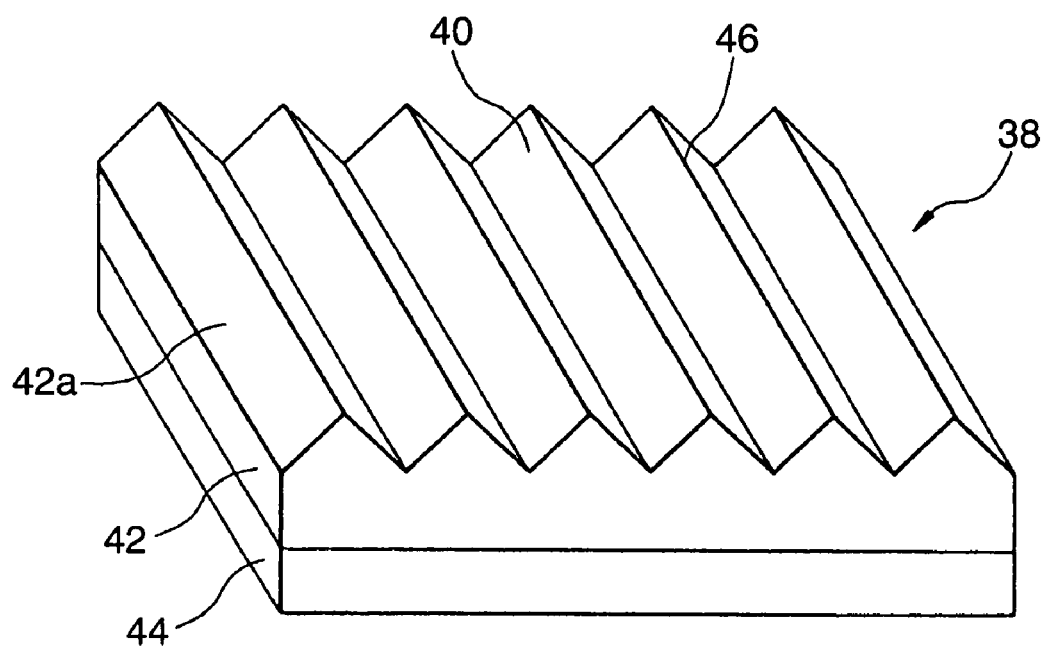
FIG. 3 is a perspective view showing the thin-plate member of FIG. 2 in an enlarged form.
Figure 4A:
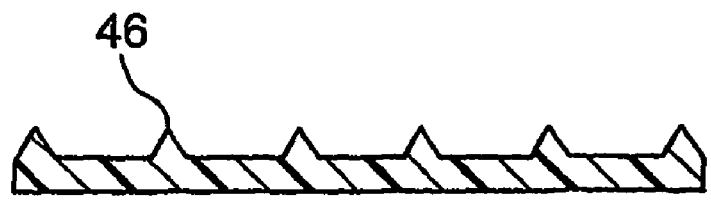
FIG. 4 (a) to (e) are enlarged sectional views of the thin-plate members according to modifications.
Figure 4B:
Figure 4C:
Figure 4D:
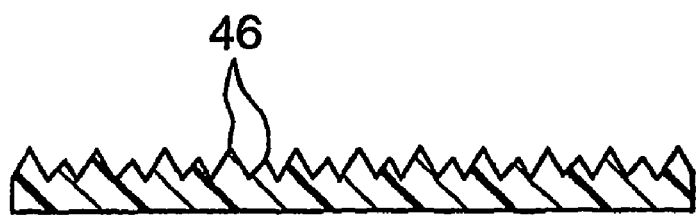
Figure 4E:

The airflow adjusting mechanism of the disk drive 10 includes a thin-plate member 38 fixed at the desired location on the inner wall surface defining the recess 24 of the casing 12. The thin-plate member 38, as shown in FIG. 3, includes a substrate layer 42 having a major side 42 formed with a plurality of minute protrusions 40, and an adhesive layer 44 attached on the other surface of the substrate layer 38 far from the major side 42a. The thin-plate member 38 is fixed on the inner wall surface 36 of the casing 12 through the adhesive layer 44 with the plurality of the minute protrusions 40 exposed to the recess 24 of the casing 12.

The thin-plate member 38 is so flexible as to be capable of following the shape of the inner wall surface 36 of the casing 12. This flexibility is given by selecting the material and size of the thin-plate member 38 as described later. Especially in the shown embodiment, the thin-plate member 38 is arranged at a predetermined location on the side surface area 36a of the inner wall surface of the casing 12 in opposed relation to the outer peripheral edges 16b of the plurality of the storage disks 16. Generally, the side surface area 36a of the casing 12 is formed in the shape of a cylinder having a radius of curvature corresponding to the radius of curvature of the outer peripheral edges 16b of the storage disks 16 in order to assure the smoothness of the airflow caused by the storage disks 16 in rotation. The thin-plate member 38 is fixed in this manner in a curved state smoothly following the shape of the inner wall surface 36 having a predetermined radius of curvature.

Also, in the shown embodiment, the plurality of the minute protrusions 40 of the thin-plate member 38 are formed as a plurality of ridges 46 (FIG. 3) extending substantially parallel to each other. The thin-plate member 38 is thus set in position on the inner wall surface 36 in such a manner that the ridges 46 making up the plurality of the minute protrusions 40 extend in the direction substantially parallel to the recording surface 16a of the storage disks 16.

The thin-plate member 38 is not limited to the construction shown in FIG. 3, but may be structured in such a manner that the minute protrusions are arranged into specific geometric patterns with flat or open areas adjacent or alternating with other minute protrusions or intrusions formed on the major surface. That is, the thin-plate member 38 may optionally contain intrusions, or convex or concave surface features, on the major surface of the substrate layer, as determined by a pyramid, square, rectangular, round, one quarter circle and combinations thereof.

The thin-plate member 38 having this configuration minimizes the friction of the surface in contact with the airflow generated by the rotation of the storage disks 16 on the side surface area 36a of the inner wall surface 36 of the casing in opposed relation to the outer peripheral edges 16b of the plurality of the storage disks 16, with the result that the airflow along the side surface area 36a is smoothly guided and stabilized substantially into a laminar flow. Thus, the effect that the vibration or the like caused by the airflow has on the storage disks 16 is suppressed very effectively.

The thin-plate member 38 may also provided on the major surface 42a of the substrate layer 42 with a surface feature having an air filtration function, either in conjunction with or separate from the airflow adjusting features. Protrusions and/or intrusions, similar to the above-described surface features, are capable of capturing or collecting particulates on the major surface of the thin-plate member 38 and the interior of a disk drive casing. From this viewpoint, chemical filtration could also be incorporated by the selection of polymers or the addition of additives such as carbon or other absorbent materials.

Also, the configuration in which the thin-plate member 38 having a sufficient flexibility is fixed at the desired location on the inner wall surface 36 of the casing through the adhesive layer 44 totally eliminates the need of machining process for mounting the thin-plate member 38 on the inner wall surface 36 of the casing 12 even in the case where the casing 12 has a rigid structure fabricated through a casting process or the like. Thus, the thin-plate member 38 simplifies the manufacturing process and reduces the manufacturing cost of the disk drive 10.

The material of substrate layer 42 of the thin-plate member 38 is not limited, but a resinous substrate made of, e.g., polypropylene, polyethylene, acrylic resin, polyimide, polyether imide, polycarbonate or polyethylene terephthalate may be employed. A liquid crystal polymer may also be used as the material of the substrate layer. The minute protrusions 40 may be formed by, e.g., an embossing process, an extrusion process, chemical etching or ion etching, on the substrate layer 42. Also, the adhesive layer 44 may be made of a general type of a pressure sensitive adhesive, and preferably of an acrylic adhesive. In this case, it is preferred for imparting a desired flexibility to use both the substrate layer 42 having a total thickness of 0.5 millimeter (mm) to 3.0 mm (including the height of the minute protrusions 40) and the adhesive layer 44 having a thickness of 30 micrometer ($\mu$m) to 100 $\mu$m in an appropriate combination.

Other examples of the ridges 46 making up the plurality of the minute protrusions 40 are shown in the sectional views of FIGS. 4(a) to (e), which are disclosed in U.S. Pat. Nos. 4,986,496, 5,069,403, 5,133,516 and 5,848,769. Desirably, in the ridges 46 of various shapes shown in FIGS. 3 and 4, the height of each ridge 46 (the distance from the base end to the top) is 20 $\mu$m to 400 $\mu$m, the angle of the V-shaped base end crossing (i.e. the valley) is 15° to 140°, and the interval between the tops of adjacent ridges 46 is 20 $\mu$m to 400 $\mu$m. The ridges 46 having any of the shown shapes can exhibit an effective function of rectifying the airflow by securing the correct directivity of the thin-plate member 38 on the inner wall surface 36 of the casing 12.

Figure 5:
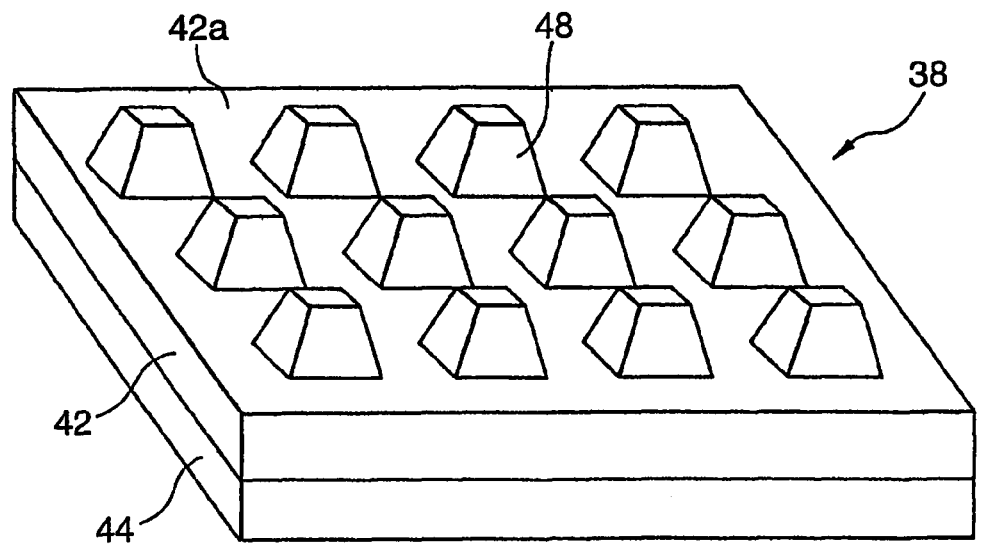
FIG. 5 is an enlarged perspective view of the thin-plate member according to a modification.
Figure 6:
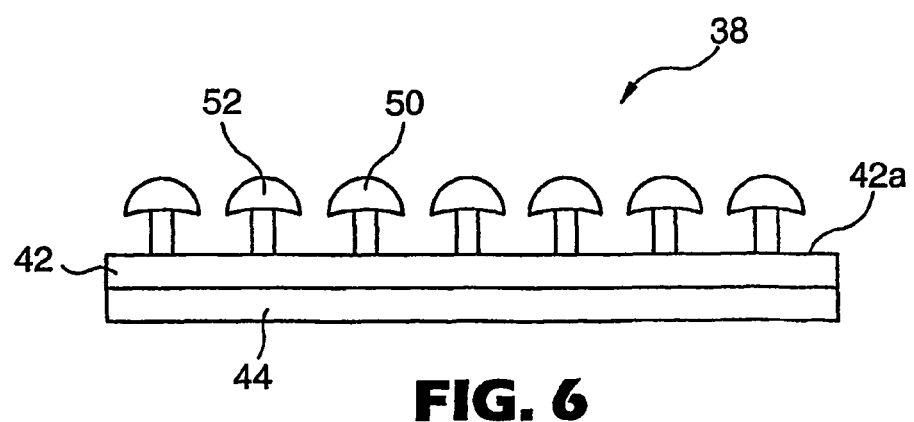
FIG. 6 is an enlarged front view of the thin-plate member according to another modification.

The plurality of the minute protrusions 40 formed on the substrate layer 42 of the thin-plate member 38 are not limited to the above-mentioned ridges 46 but may be configured of, for example, pyramidal protrusions 48 shown in FIG. 5 or mushroom-shaped headed elements 50. In any case, the plurality of the minute protrusions 40 exhibit the above-mentioned function of rectifying the airflow generated around the storage disks 16 rotating at high speed, by fixing the thin-plate member 38 in an appropriate direction on the desired portion of the inner wall surface 36 of the casing 12. As a result, the stabilization of the airflow is promoted and the effect that the vibration or the like caused by the airflow has on the storage disks 16 is effectively suppressed.

Figure 7:
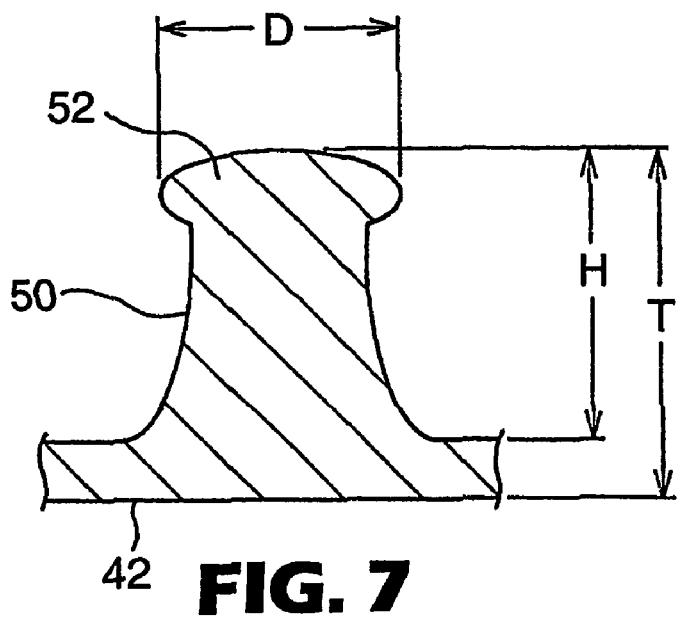
FIG. 7 is a partly enlarged sectional view showing a preferred shape of a headed element of the thin-plate member of FIG. 6.

Especially, the headed elements 50 each having a bulging head 52 at the end are known to exhibit a superior effect of rectifying the airflow. In this case, the headed elements 50 advantageously have a section in the shape shown in FIG. 7. As an example of the sizes of the various parts of the substrate layer 42 having the headed elements 50 of this shape described above, the diameter D of the head 52 is 0.300 mm, the height H of the headed element 50 is 0.325 mm and the total thickness T of the substrate layer 42 is 0.44 mm.

In the case where the plurality of the minute protrusions 40 are formed of ridges 46, the material that can be preferably employed for the substrate layer 42 of the thin-plate member 38 includes, for example, a tape with protrusions (Model B-100) that can be acquired from Minnesota Mining & Manufacturing (Minnesota, USA). In the case where the plurality of the minute protrusions 40 are the headed elements 50, on the other hand, a tape with headed elements (Model CS-200) that can be acquired from Minnesota Mining & Manufacturing (Minnesota, USA) can be employed.

Figure 8:
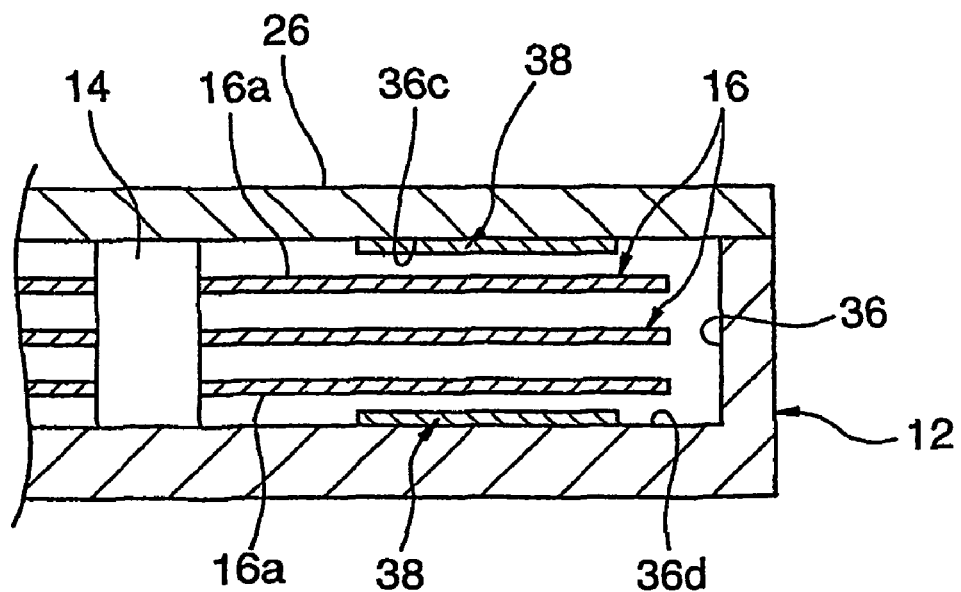
FIG. 8 is a sectional view schematically showing a disk drive having the thin-plate members arranged at different locations.

The thin-plate member 38 having the aforementioned configuration can alternatively be arranged, as shown in FIG. 8, at a predetermined location on the bottom surface area 36b of the inner wall surface 36 of the casing 12 in opposed relation to the lower recording surface 16a of the storage disk 16 located at the lower end or at a predetermined location of the top surface area (the reverse side of the cover 26, for example) of the inner wall surface 36 of the casing 12 in opposed relation to the upper recording surface 16a of the storage disk 16 located at the upper end. Also in this configuration, the thin-plate member 38 works to minimize the friction of the surface in contact with the airflow generated by the rotation of the storage disks 16 on the bottom surface 36b or the top surface area 36c, as the case may be, of the inner wall surface 36 of the casing in opposed relation to the recording surface 16a of the plurality of the storage disks 16 and thereby stabilizes the airflow substantially into a laminar flow, whereby the effect that the vibration or the like caused by the airflow has on the storage disks 16 can be very effectively suppressed.

Further, the thin-plate member 38, due to its own flexibility, can be fixedly attached in a curved state to smoothly fit a deformed inner wall surface 36 (such as the portion designated by reference numeral 54 in FIG. 1, for example) not conforming with the radius of curvature of the outer peripheral edges 16b of the storage disks 16 or the surface of each component part arranged in the recess 24 of the casing 12. Also, even in a disk drive of a different type having built therein storage disks of different radii of curvature (hence, different diameters), the thin-plate member 38 of the same configuration can be widely used and arranged at the desired location in the casing.

The thin-plate member according to the present invention may also have a function for reducing acoustic emissions from the disk drive. With fluid bearing on disk-driving spindles in the disk drive, airflow noise is becoming a dominant noise feature. In this respect, the thin-plate members can reduce noise generated by changing airflow characteristics of the surface, and/or absorbing and/or dissipating acoustic noise generated in the disk drive.

Preferable embodiments of the invention have been described above. The present invention, however, is not limited to the configurations of the shown embodiments, but can be variously modified or changed without departing from the scope of the claims. For example, the disk drive and the method of manufacturing it according to the present invention are applicable to disk drives having storage disks such as optical disks or magneto-optic disks other than magnetic disks.

Furthermore, the thin-plate member may have at least one function selected from an anti-static function, a charge-surface function for attracting particulates and a moisture absorption function. Also, the thin-plate member may have at least one function selected from an electromagnetic-interference reducing function and a radio-frequency-interference reducing function.

EXAMPLE

In a 8.89 cm (3.5-inch) hard disk drive having the basic configuration shown in FIG. 1, the storage disks 16 are rotated at 10000 rpm, and the vibration in a vertical direction (along the axis of the drive shaft 14) of the storage disk 16 located at the upper end was measured with a laser displacement gauge for both the structure according to this invention (FIG. 2) having the thin-plate member 38 mounted on the side surface area 36a of the inner wall surface 36 of the casing and the conventional structure lacking the thin-plate member 38. The point of measurement was set at the diametrical center of the recording surface 16a of the storage disk 16. The two types of thin-plate members 38 were used, one including the substrate layer 42 formed with the minute protrusions 40 configured of a plurality of ridges 46 (sample 1) and the other including the thin-plate member 38 having the substrate layer 42 formed with the minute protrusions 40 made up of a plurality of headed elements 50 (sample 2). As a result, the vibration of 1.71 μm in terms of amplitude occurred in the vertical direction in the storage disk 16 at the upper end of the conventional structure, whereas the vibration amplitude for the structure according to the invention was suppressed to 1.33 μm for sample 1 and 0.87 μm for sample 2.

As evident from the foregoing description, according to this invention, there is provided a disk drive for writing and reading data into and from storage disks, wherein a highly reliable airflow adjusting mechanism can be mounted inexpensively and easily, which is capable of effectively suppressing, by adjusting the airflow caused around the storage disks rotating at high speed, the effect that the vibration or the like caused by the airflow has on the storage disks.

What is claimed:

1. A disk drive comprising:

a casing having an inner wall surface defining a recess;

a rotatable storage disk arranged in said recess of said casing and having a recording surface;

an actuator arranged in said recess of said casing at a location near said storage disk, said actuator carrying a head section to be opposed to said recording surface of said storage disk and causing said head section to perform a tracking operation relative to said recording surface; and an airflow adjusting mechanism for adjusting an airflow generated around said storage disk in said recess of said casing due to a rotation of said storage disk, said airflow adjusting mechanism comprising a thin-plate member having a flexibility that permits said thin-plate member to follow a shape of said inner wall surface of said casing, said thin-plate member comprising a substrate layer having a major side and a back side opposite to said major side, a plurality of minute protrusions formed on said major side and an adhesive layer attached to said back side of said substrate layer, said thin-plate member being fixedly attached to said inner wall surface of said casing through said adhesive layer with said plurality of minute protrusions being exposed to said recess of said casing.

2. The disk drive of claim 1, wherein said plurality of minute protrusions of said thin-plate member comprise a plurality of ridges extending generally in parallel to each other.

3. The disk drive of claim 1, wherein said plurality of minute protrusions of said thin-plate member comprise a plurality of headed elements, each headed element respectively having bulging heads at distal ends thereof.

4. The disk drive of claim 1, wherein said thin-plate member is arranged at a location opposed to an outer peripheral edge of said storage disk.

5. The disk drive of claim 1 wherein said thin-plate member is arranged at a location opposed to said recording surface of said storage disk.

6. The thin-plate member incorporated, as an airflow adjusting mechanism, in a disk drive of claim 1.

7. The thin-plate member of claim 6, wherein said minute protrusions are arranged into specific geometric patterns with flat or open areas adjacent or alternating with other minute protrusions or intrusions formed on said major surface.

8. The thin-plate member of claim 6, further provided with a surface having an air filtration function.

9. The thin-plate member of claim 6, further having a function for reducing acoustic emissions from said disk drive.

10. The thin-plate member of claim 6, further having at least one function selected from an anti-static function, a charge-surface function for attracting particulates and a moisture absorption function.

11. The thin-plate member of claim 6, further having at least one function selected from an electromagnetic-interference reducing function and a radio-frequency-interference reducing function.

* * * * *